US012225267B2

(12) United States Patent
Bustamante et al.

(10) Patent No.: US 12,225,267 B2
(45) Date of Patent: Feb. 11, 2025

(54) LEVERAGING INSIGHTS FROM REAL-TIME MEDIA STREAM IN DELAYED VERSIONS

(71) Applicant: Phenix Real Time Solutions, Inc., Chicago, IL (US)

(72) Inventors: Fabián E. Bustamante, Evanston, IL (US); Stefan Birrer, Chicago, IL (US)

(73) Assignee: Phenix Real Time Solutions, Inc., Chicago, IL (US)

( * ) Notice: Subject to any disclaimer, the term of this patent is extended or adjusted under 35 U.S.C. 154(b) by 24 days.

(21) Appl. No.: 17/818,112

(22) Filed: Aug. 8, 2022

(65) Prior Publication Data

US 2024/0048807 A1  Feb. 8, 2024

(51) Int. Cl.
*H04N 21/466* (2011.01)
*H04N 21/442* (2011.01)
*H04N 21/83* (2011.01)
*H04N 21/8547* (2011.01)

(52) U.S. Cl.
CPC ... *H04N 21/4667* (2013.01); *H04N 21/44218* (2013.01); *H04N 21/83* (2013.01); *H04N 21/8547* (2013.01)

(58) Field of Classification Search
CPC ......... H04N 21/4667; H04N 21/44218; H04N 21/83; H04N 21/8547; H04N 21/8549; H04N 21/2187; H04N 21/44008; H04N 21/4223; H04N 21/23418; H04N 21/8456; H04N 21/21805; H04N 23/90; H04N 23/60; H04N 21/23439; H04N 21/23614

USPC ........................................................ 725/46
See application file for complete search history.

(56) References Cited

U.S. PATENT DOCUMENTS

| 11,425,182 | B1 | 8/2022 | Shubin et al. | |
|---|---|---|---|---|
| 2012/0210348 | A1* | 8/2012 | Verna | H04N 21/4307 386/338 |
| 2012/0210383 | A1* | 8/2012 | Sayers | H04N 21/2393 725/116 |
| 2013/0291025 | A1* | 10/2013 | Ozawa | H04N 13/178 725/61 |
| 2015/0264296 | A1* | 9/2015 | Devaux | H04N 5/77 386/226 |
| 2016/0012856 | A1* | 1/2016 | Cave, Jr. | G11B 27/005 386/241 |
| 2017/0237903 | A1* | 8/2017 | Pickett | H04N 23/6811 348/208.4 |

(Continued)

OTHER PUBLICATIONS

M. Merler et al., "Automatic Curation of Sports Highlights Using Multimodal Excitement Features," in IEEE Transactions on Multimedia, vol. 21, No. 5, pp. 1147-1160, May 2019, doi: 10.1109/TMM.2018.2876046. (Year: 2019).*

(Continued)

*Primary Examiner* — Cynthia M Fogg
(74) *Attorney, Agent, or Firm* — Perkins Coie LLP; Michael Glenn; Colin Fowler (57) ABSTRACT

A set of techniques leverages a real-time version of a media stream to gather information on its content which information is used to improve or augment the service delivery of other versions (e.g., live or video-on-demand) of the same stream. These techniques take advantage of the fact that the real-time version of a stream is sufficiently ahead, in time, from any other version to enable the gathering and use of information on the stream content.

33 Claims, 9 Drawing Sheets

Figure 7: Tagging of scenes and adaptation (56) References Cited

U.S. PATENT DOCUMENTS

| | | | |
|---|---|---|---|
| 2017/0332036 A1* | 11/2017 | Panchaksharaiah | ........................ H04N 21/2187 |
| 2018/0161682 A1* | 6/2018 | Myhill | ............... H04N 21/8173 |
| 2018/0302630 A1 | 10/2018 | Copley et al. | |
| 2019/0110096 A1 | 4/2019 | Shaw et al. | |
| 2020/0021866 A1 | 1/2020 | Koumchatzky et al. | |
| 2020/0053401 A1* | 2/2020 | Obara | ................... G11B 27/005 |
| 2020/0137441 A1* | 4/2020 | Lee | ....................... G06F 16/735 |
| 2020/0288191 A1 | 9/2020 | Barnett et al. | |
| 2020/0396469 A1 | 12/2020 | Syed et al. | |
| 2021/0021806 A1* | 1/2021 | He | .................... H04N 21/8456 |
| 2021/0136424 A1 | 5/2021 | Lo et al. | |
| 2021/0243481 A1 | 8/2021 | Birrer et al. | |
| 2021/0275908 A1 | 9/2021 | Amer et al. | |
| 2021/0400329 A1* | 12/2021 | Singhal | ............. H04N 21/4728 |
| 2023/0300430 A1* | 9/2023 | Mishra | ........... H04N 21/440236 386/241 |
| 2024/0024788 A1* | 1/2024 | Walker | ................. A63F 13/355 |

OTHER PUBLICATIONS

A. Bera, "Artificial Intelligence: Transforming the Live Sports Landscape," in SMPTE Motion Imaging Journal, vol. 130, No. 3, pp. 28-34, Apr. 2021, doi: 10.5594/JMI.2021.3060823. (Year: 2021).*
International Search Report and Written Opinion dated Jan. 22, 2024 cited in PCT/US2023/071736, 27 pages.

* cited by examiner

Figure 1: Different coding rates of a stream

Figure 2: Key and prediction frames on chunks (top) and streams (bottom)

FIG. 2

Figure 3: Stream adaptation

FIG. 4

Figure 4: Multiple version of a single stream: Real-time, Live and Archived

Figure 5: The real-time version of a stream is ahead of the live or archived/VoD versions

FIG. 6

Figure 7: Tagging of scenes and adaptation

*FIG. 9*

LEVERAGING INSIGHTS FROM REAL-TIME MEDIA STREAM IN DELAYED VERSIONS

TECHNICAL FIELD

The present disclosure relates to media streaming, including the continuous transmission of audio or video files from a collection of servers to one or more clients, over packet-switched networks such as the Internet. Media streaming includes real-time, live, and video-on-demand streaming.

BACKGROUND

Media streaming is a dominant form of application traffic on the Internet. In a typical streaming service, video and/or audio data is streamed as a sequence of packets from a collection of servers. The stream is stored or captured on the servers and transmitted to several users for playback. Media streaming services typically offer multiple versions of the same streams, including real-time, live, and archived streams. In such services, archived streams are used for Video-on-Demand (VoD) streaming.

Real-time media streaming refers to streamed content that is enabling interactivity between viewing participants. Real-time streams are transmitted over the Internet without first being recorded and stored. Real-time viewers see the content synchronously and thus drive engagement, thereby enabling social interactions and increasing revenues. A non-limiting example case of real-time streaming uses latency of less than a half second.

Live media streaming refers to the online streaming of media simultaneously recorded and broadcasted as it happens to one or more users. Live media streaming allows rebuffering of events. A non-limiting example case of live streaming uses latencies from five seconds to up to a minute.

VoD streaming refers to the streaming of media as stored on one or more servers to users at any point in time without the timing constraints of real-time or live streaming.

DETAILED DESCRIPTION

Different versions of a stream aim at different scales of audiences and represent different tradeoffs in the quality and definition of the media stream. In terms of scale, real-time and live users tend to be a fraction of archival/VoD users who can watch the recorded stream at any point in the future.

Common technology used for real-time streaming includes real-time messaging protocol (RTMP), which is a TCP-based protocol originally developed for streaming between a Flash player and a server, and Web RealTime Communications (WebRTC), which is an open and scalable industry-standard that uses UDP for data transport. For live streaming and VoD streaming, typical protocols include HTTP Live Streaming (HLS), Microsoft Smooth Streaming, and Dynamic Adaptive Streaming over HTTP (DASH).

A compressed media stream is made of a series of keyframes, sometimes referred to as intra-frames in VP8 or keyframes in MPEG, and prediction frames or inter-frames in VP8 and P-frames in MPEG terminology. Keyframes are decoded without reference to any other frame in a sequence. Video compression achieves compression efficiency gains from using inter-frame dependencies. These dependencies make the stream susceptible to packet loss and place restrictions on random access. The correct decoding of a predictive frame typically depends on the correct decoding of the most recent keyframe and all ensuing predictive frames. Keyframes provide random access (or seeking) points in a video stream.

Decoding algorithms are typically not tolerant of dropped keyframes because prediction frames are encoded in reference to prior frames, specifically all prior frames up to and including the most recent keyframe. Where frames are be dropped or corrupted, correct decoding requires that a keyframe is correctly received.

Figure 1:
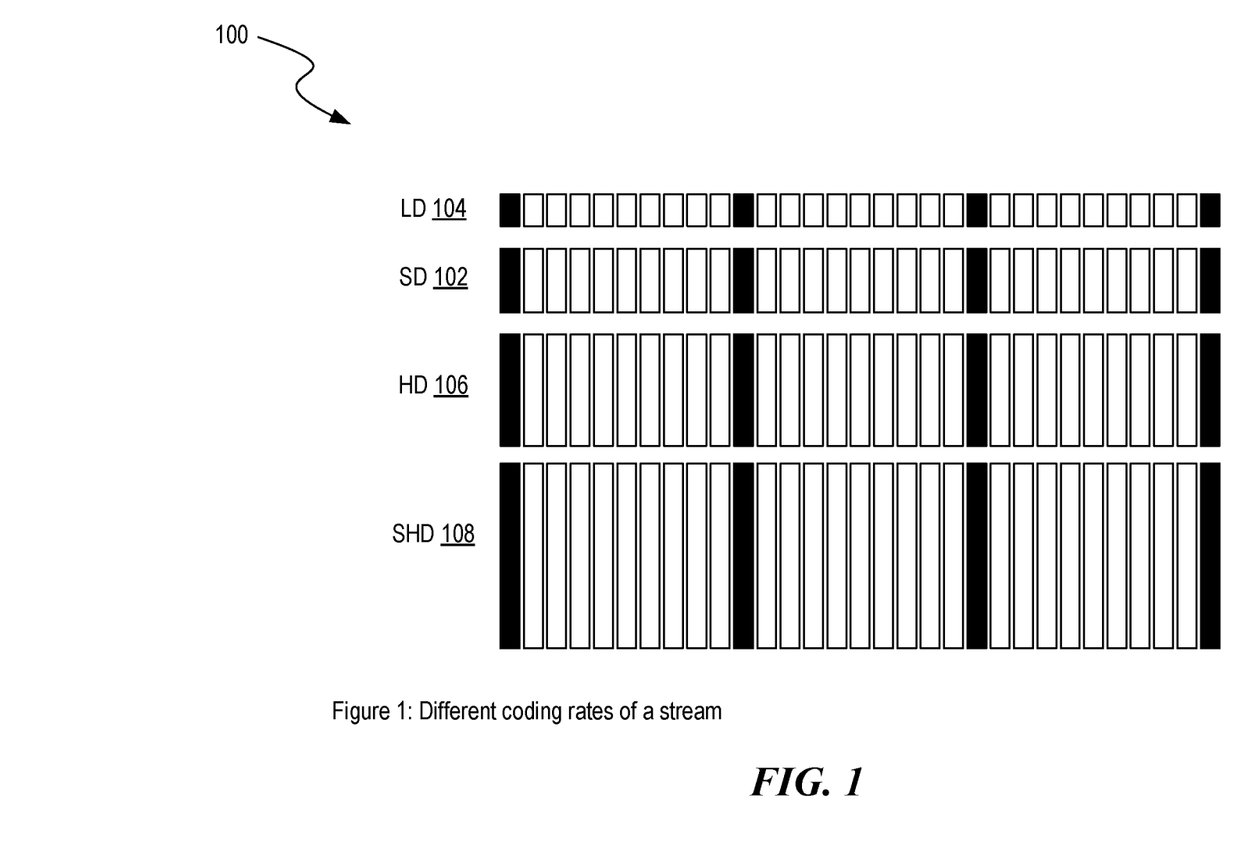
FIG. 1 is a diagram that illustrates different encodings of a stream such as Standard Definition (SD), Low Definition (LD), High Definition (HD), and Super High Definition (SHD) by way of physical size.
Figure 2:
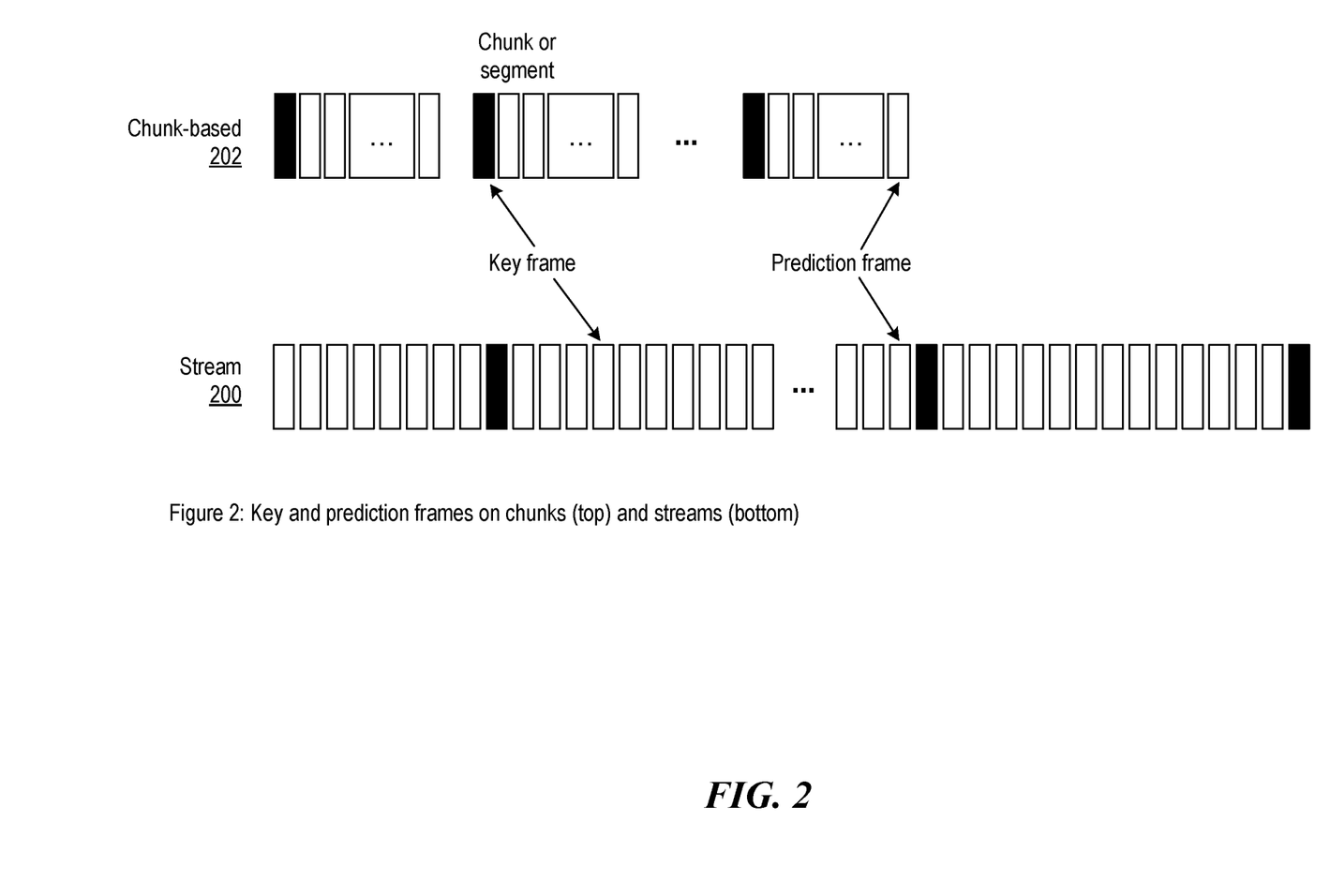
FIG. 2 is a diagram that illustrates implementation of key and prediction frames on chunks and streams.

State-of-the-art media streaming systems rely on multi-bit-rate (MBR) encoding in which the source video content is encoded in alternative bitstreams at different coding rates. Multiple encoding rates 100 are depicted in FIG. 1. Example streams include Standard Definition (SD) 102, Low Definition (LD) 104, High Definition (HD) 106, and Super High Definition (SHD) 108. The higher quality bit rate encoding is illustrated by larger packets. Content is streamed directly or in segments/chunks. FIG. 2 illustrates direct 200 and chunk-based 202 packet delivery. The levels of quality corresponding to different encoding rates are based on changing network conditions. Specifically, the source content is encoded at multiple bit rates and potentially segmented into small multi-second parts.

Figure 3:
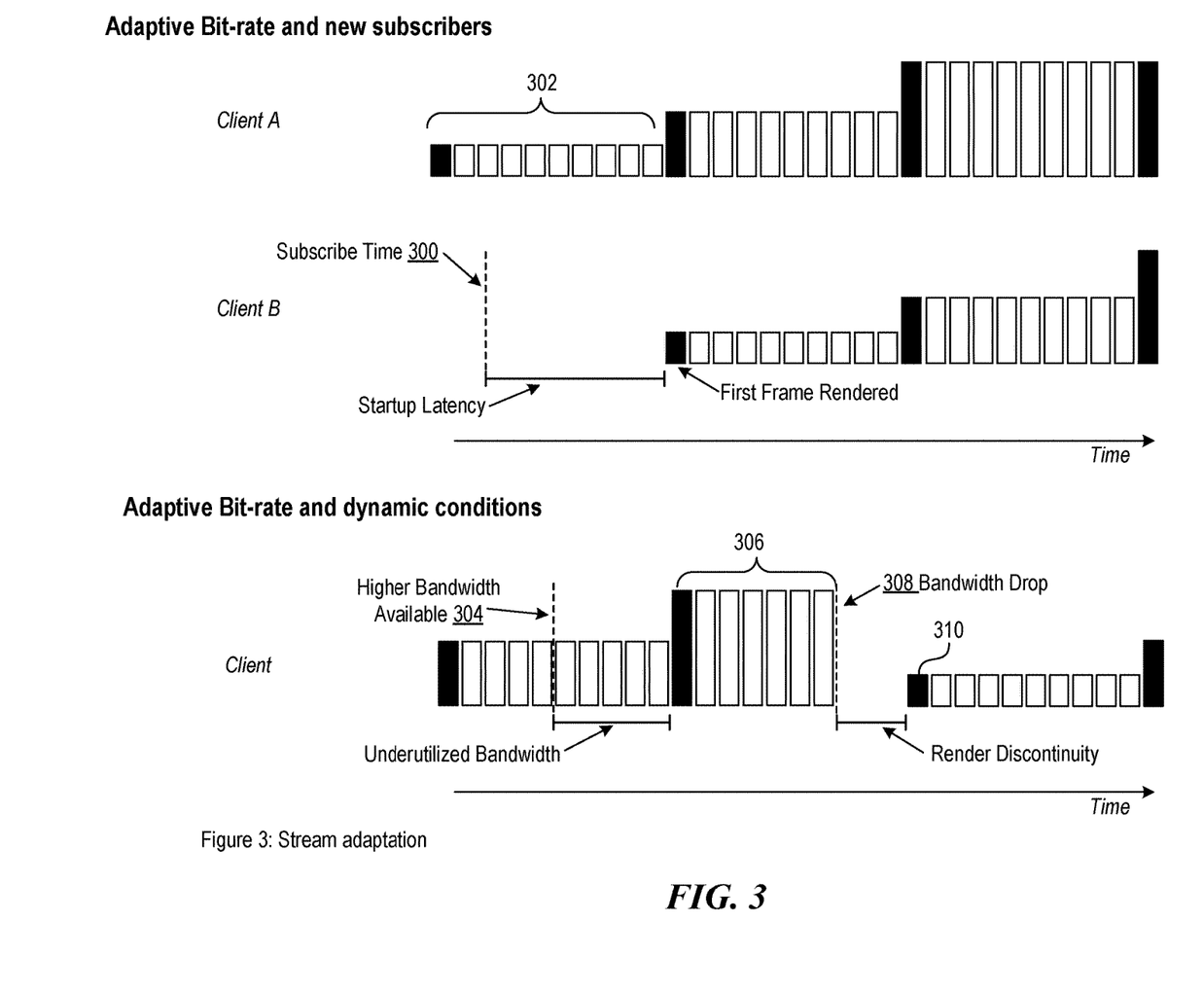
FIG. 3 is a diagram that illustrates adaptive bit-rate streaming.

FIG. 3 depicts an application of adaptive bit rate encoding. The streaming client includes the multiple available streams at different bit rates, and (if necessary) processes segments within the streams based on a manifest file. When starting, the client subscribes 300 to or requests data from a reasonably low bit-rate stream 302. Where the client identifies that the download speed allows for a greater bit rate (upshifting of encoding rate), the client requests 304 the next higher bit rate 306. If, on the other hand, the client finds the download speed to be lower than the bit rate for the stream 308, the client subscribes to lower bit-rate data (downshifting of encoding rate) 310.

Figure 4:
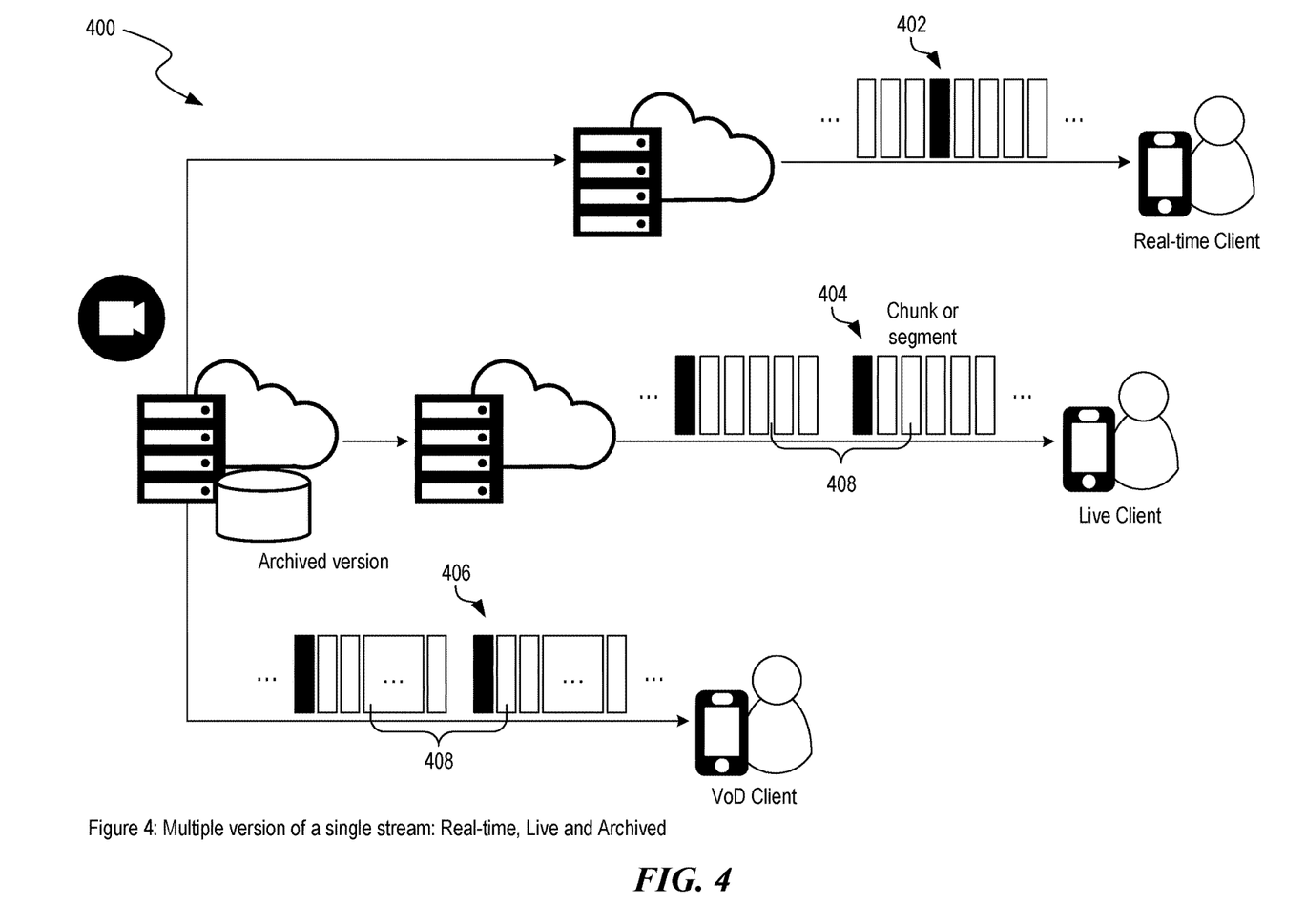
FIG. 4 is a diagram that illustrates multiple versions of a single stream, including real-time, live, and video-on-demand.

FIG. 4 illustrates several versions of a media or multimedia stream. Many media streaming services offer different versions of streams 400 of the same streaming content, such as a real-time stream 402, a live stream 404, and archived for VoD stream 406 streaming. These services allow users to select versions or decide on a stream version on the user's behalf. For example, real-time users are sometimes of a limited subscriber count, and additional users are instead allocated to the live stream. In an example, all versions of a stream 400 are concurrently in use with perhaps tens of users subscribed to the real-time stream 402 version, a few hundred of them on the live stream 404, and perhaps thousands or millions of users subscribed to the VoD stream 406.

Known systems treat the different versions of streams 400, such as the real-time stream 402, the live stream 404, and the VoD stream 406 as independent streams, abandoning any opportunity to leverage insights across the stream's versions. This disclosure discusses techniques that leverage the live and real-time version of a media stream to gather information on the content thereof and then leverage that information to improve or augment the service delivery of other versions of the same stream.

In some embodiments, the streaming platform identifies quality-sensitive scenes in real-time streaming or live streaming to steer the service in the delivery of the later versions, i.e., the live stream 404 and the VoD stream 406 versions, respectively. While most streaming services treat all scenes in the version of a stream as equally important in terms of quality, not all scenes are equal from the viewer's perspective. A challenge faced is to distinguish between a quality-sensitive or non-sensitive segment of a stream, sufficiently ahead of time, so that the delivery apparatus adapts to the distinction.

Content tags 408 attached to the earlier streams enable adaptation. There are several mechanisms for issuing content tags 408 to relevant portions of the stream to indicate that a portion is of more importance, e.g., an upvote, or of less importance, e.g. a downvote. In some embodiments, content tags 408 are indicative of increased or decreased priority of encoding delivery of the stream.

In some embodiments, the content tags 408 are issued by a human operator. A subscriber of the real-time stream 402 or live stream 404 identifies and tags important or unimportant scenes as they happen. In some embodiments, the content tags 408 are crowd sourced from the audience of the real-time stream 402 or live stream 404. Viewers interact with the stream and that interaction, e.g., social interface controls or behavioral monitoring, is evaluated in the aggregate to generate content tags 408.

Example crowd interactions include issuance of sentiment indicating emoticons, e.g., hearts, thumbs up, smiley, thumbs down, poop emoji, sentiment or keyword analysis of text chat, or direct voting. In some embodiments, crowd interaction is detected by available sensors or by user settings. For example, gaze detection by available web cams identifies where the attention of viewers is directed. Further, operating system window precedence ranks the stream presentation. Where a given window, e.g., a browser open to a streaming platform, is on a top layer display in the operating system the viewer represents the scene as higher importance than a user who has the stream minimized or on a lower layer of presentation. Similarly, a user who has muted their stream or device audio output is indicating lower interest in the content.

In some embodiments the content tags 408 are issued automatically by a machine learning model. The machine learning model evaluates content of the stream and issues content tags. Training of the machine learning model is supervised based on observing the tag issuance of the human operator or crowd, e.g., the machine-learning algorithm is simultaneously trained in situ by the human operator's tagging. In some embodiments training of the machine learning model is based on training of scenes pertaining to a subset of content, e.g., football games, rugby games, video game streamers, specifically provided to the model as indicative of important or less important content. High interest scenes, such as a score in a competition or a dramatic moment are identified either by aggregate crowd sourcing sentiment, administrative user tagging, labeled content, or continuous model learning.

The content tags 408 of important scenes are used to adapt the delivery of the later versions, e.g., the live stream 404 or the VoD stream 406 versions respectively, by increasing the assigned buffer size before the tagged segment, pre-buffering the selected scenes and/or caching those scenes for some (configurable) amount of time, or reducing the encoding quality surrounding the tagged content. In some embodiments, the system supports the tagging of scenes based on specific maturity rating systems that later are used to filter out age-inappropriate content on a slightly delayed version of the stream, including, for example, language, inadvertent clothing issues.

The described techniques build on two key observations. First, a given media stream typically exists in multiple versions including the real-time stream 402, the live stream 404, and archived for the VoD stream 406. Second, the real-time stream 402 of the stream is sufficiently ahead, in time, from other versions 404, 406 of the same stream to allow the gathering of information on its content that can be used to improve or enhance the delivery of those later streams 404, 406. Similarly, the live stream 404 can be used to improve or enhance the delivery of the VoD stream 406.

Figure 5:
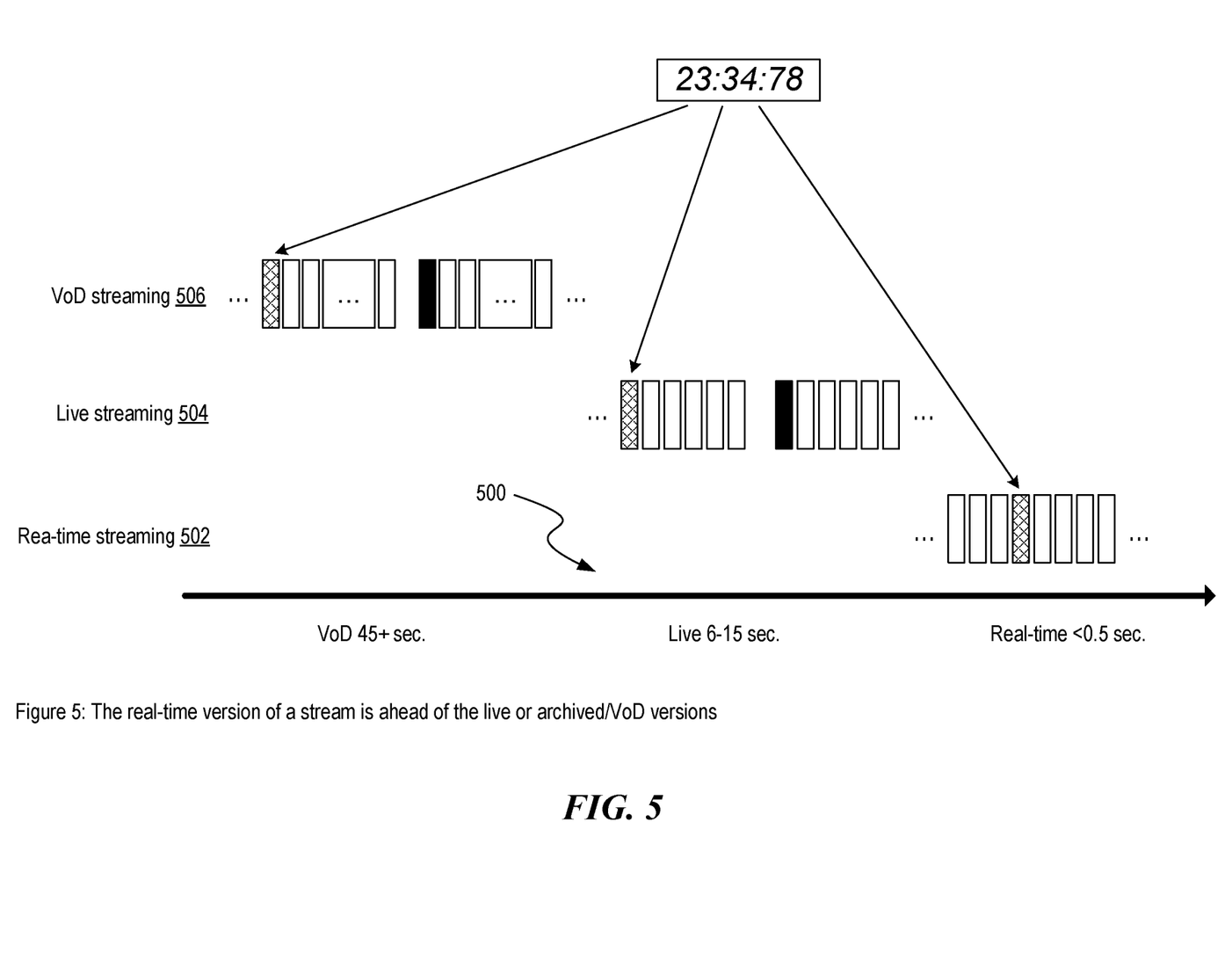
FIG. 5 is a diagram that illustrates a delay between the real-time version of a stream the live and archived/video-on-demand versions.

FIG. 5 is a diagram that illustrates a delay 500 between the real-time version 502 of a stream and the live 504 and archived/video-on-demand 506 versions of the stream. There are several contributors to the delay that places the live 504 stream version in the past, including client buffering, chunking, and polling. Real-time streaming operates on individual video frames while live protocols, such as HLS, operate on chunks or collections of video frames. In addition, live streaming protocols rely on a pull-based model instead of a push-based model in which users periodically pull the servers for new chunks. The latency difference between the live 504 and real-time version 502 of a stream can vary from tens of seconds to a few seconds for optimized versions of live protocols.

Figure 6:
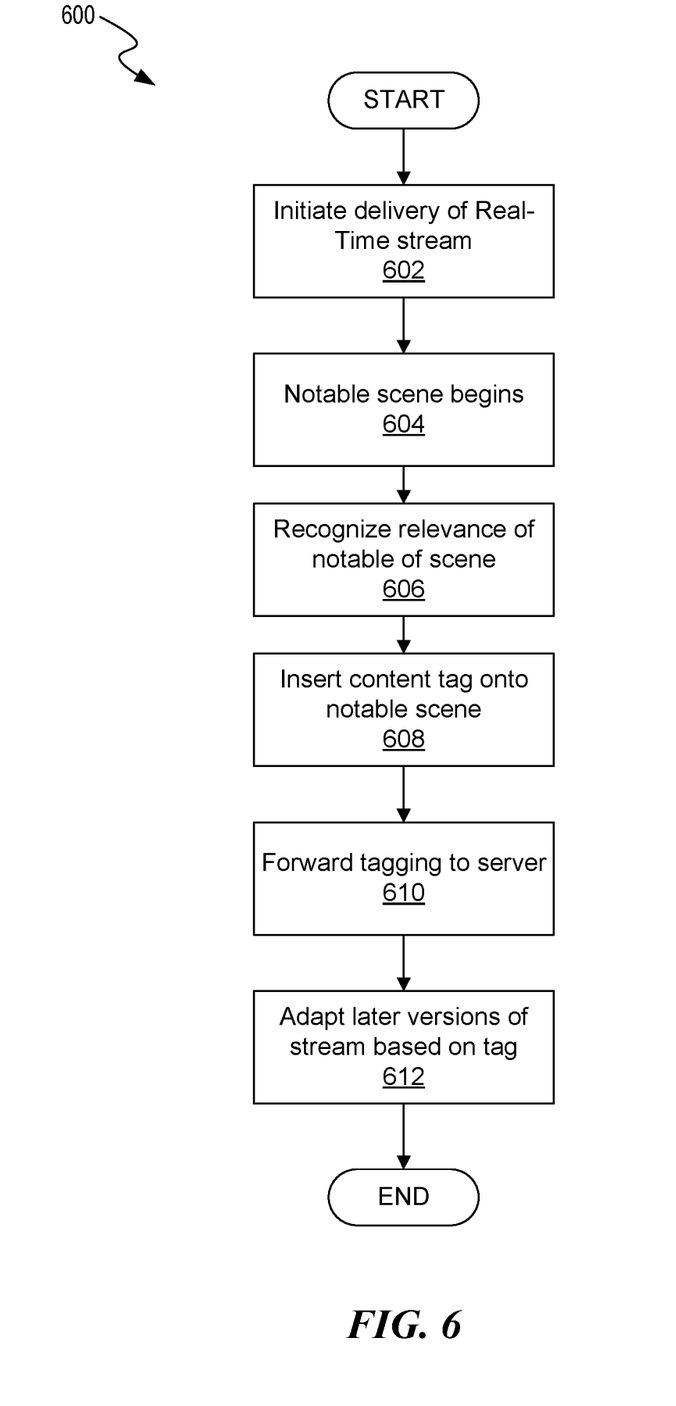
FIG. 6 is a flowchart that illustrates a method of modification of subsequent multimedia streams.

FIG. 6 is a flowchart that illustrates a method for modifying subsequent multimedia streams. In step 602, a set of multimedia content begins delivery as a real-time broadcast. Most streaming services treat all scenes in the version of a stream as equally important in terms of quality. In these services, the scenes corresponding to the scoring of a goal in a soccer game or a period of passes in the midfield, are equally important. From the viewer's perspective, the goal scoring is more important than the series of midfield passes. Thus, it is more important for the quality of content delivery that the more important scene is most clearly presented to the viewer.

In step 604, an important scene begins occurring in the real-time stream—a goal is scored in a soccer game. In step 606, the streaming platform recognizes the importance of the scene. Recognition of importance takes several varied embodiments. Example embodiments include recognition by an administrative viewer, aggregate crowd sentiment/voting, or a machine learning model. Once identified, in step 608 the scene is tagged/upvoted by the platform.

Tags are characterized by timestamps. In some embodiments a single timestamp defines the tag, and in other embodiments multiple tags bound a segment of the stream. In some embodiments, a content tag further includes metadata that indicates a particular sentiment, or that a particular adaptation is requested for the server to implement in subsequent streams, e.g., prebuffering, a camera cut, introduce multiple camera angles. In step 610, the tagging is forwarded to one or more servers upstream.

In step 612, the servers implement the tag to adapt the delivery of the later streams (e.g., live or VoD versions) of the same stream by, for instance, increasing the assigned buffer size before the tagged segment, prebuffering, temporarily lowering the resolution of preceding segments to reduce the chance of buffer draining, removing content, inserting additional camera angles of portions marked by the plurality of content tags either in series or in frame share, or interchanging the presenting camera from a first camera of the multiple camera angle inputs to a second camera of the multiple camera angle inputs.

Modifying to insert additional camera angles is a function that is present where a given set of content includes multiple cameras that are interchanged therebetween based on whatever schema is implemented for the given set of content. Inserting additional angles in series increases the length of the stream and potentially increases the delay between the subject version and the real-time version. Inserting camera angles in a frame share refers to splitting the display screen to display multiple camera angles simultaneously. Interchanging the cameras between multiple available cameras includes cutting from one presenting camera to another presenting camera.

Another potential application is in the selecting/tagging of important scenes of a stream is to identify replay highlights. In some embodiments, highlights are pre-buffered and cached.

FIG. 6 is described from the perspective of upvoting a scene; however, some embodiments of the platform are configured to downvote scenes. Downvoted scenes are deemphasized in the later versions of the stream. Deemphasizing a scene highlights that scene for any of lower buffer usage, lower encoding, content cuts, implementation of text overlays, addition of audio commentary, or split screen multi-camera views.

Upvoting and downvoting is described as a binary outcome, but tiered tagging is also a valid embodiment. For example, a maturity rating system is modeled to a set of tiers that are used to modify later versions. The maturity rating tags are used to skip over material inappropriate for a give viewer's age.

During operation, while any tagging approach should aim to minimize errors, the inaccurate tagging of a video segment as important, some implementations prefer over tagging as opposed to failure to tag an important segment. Unnecessary tagging a segment as important translates into unnecessary adaptations, i.e., wasted or wrongly re-allocated resources, while failure to tag content as important impacts the user's perceived quality of experience.

When tagging is used to identify moments in the stream when it would be least disruptive to switch to an alternative view of an event, e.g., from one side to another of a stadium, the system makes use of additional metadata within the content tag. The additional metadata indicates platform handling to automatically change views at the tagged scenes or delay a user requested changed of view until the next tag.

Figure 7:
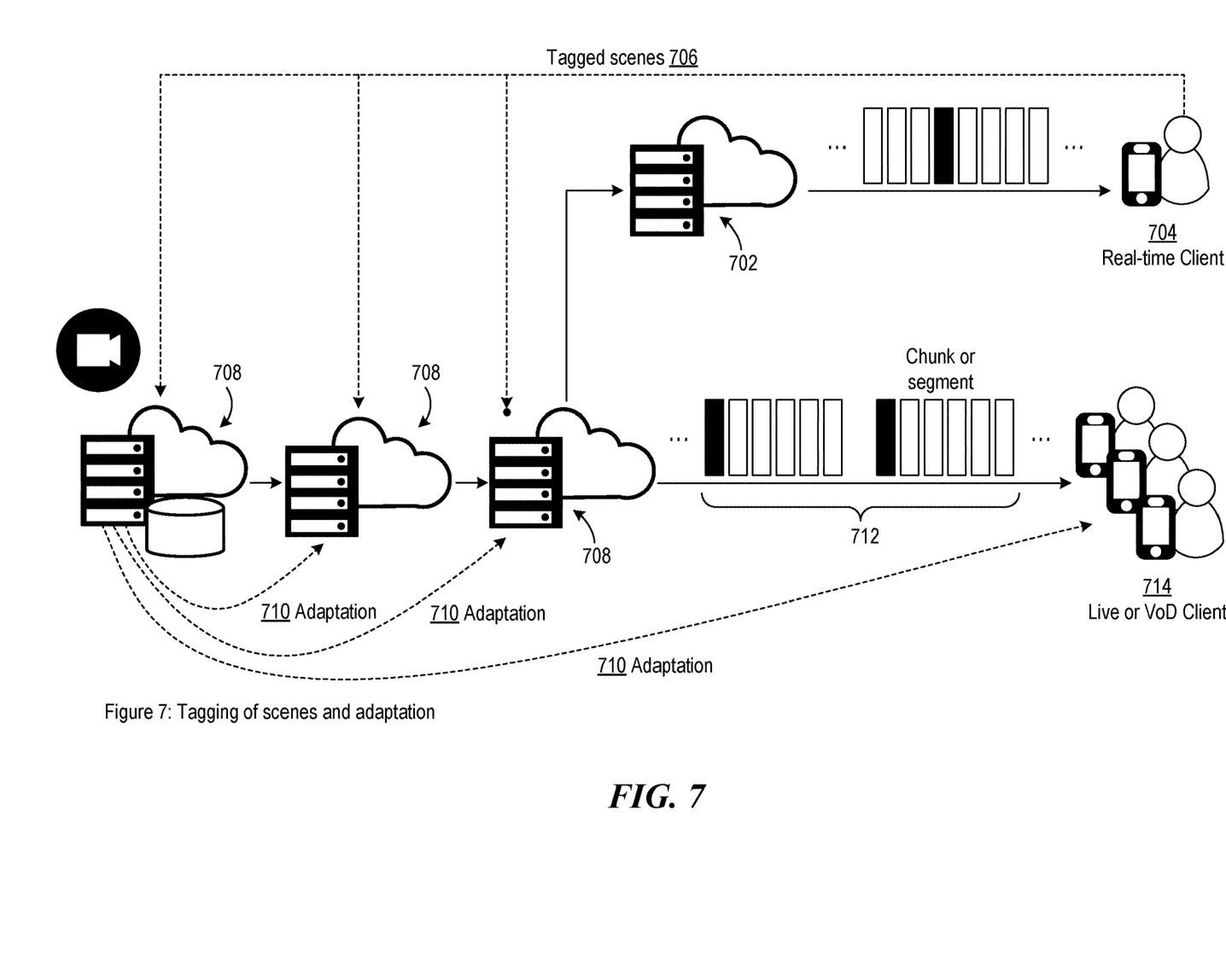
FIG. 7 is a diagram depicting the tagging of scenes in a real-time stream and a path of adaptation of the other versions of a stream.

FIG. 7 is a diagram depicting the tagging of scenes in a real-time stream and a path of adaptation of the other versions of a stream. An initial server 702 delivers the real-time stream to a real-time client 704. Tagged scenes 706 are transmitted to subsequent stream servers 708 that implement live streams and/or VoD. Adaptations 710 are applied to the subsequent stream 712 and viewed by live or VoD clients 714.

Computing Platform

Figure 8:
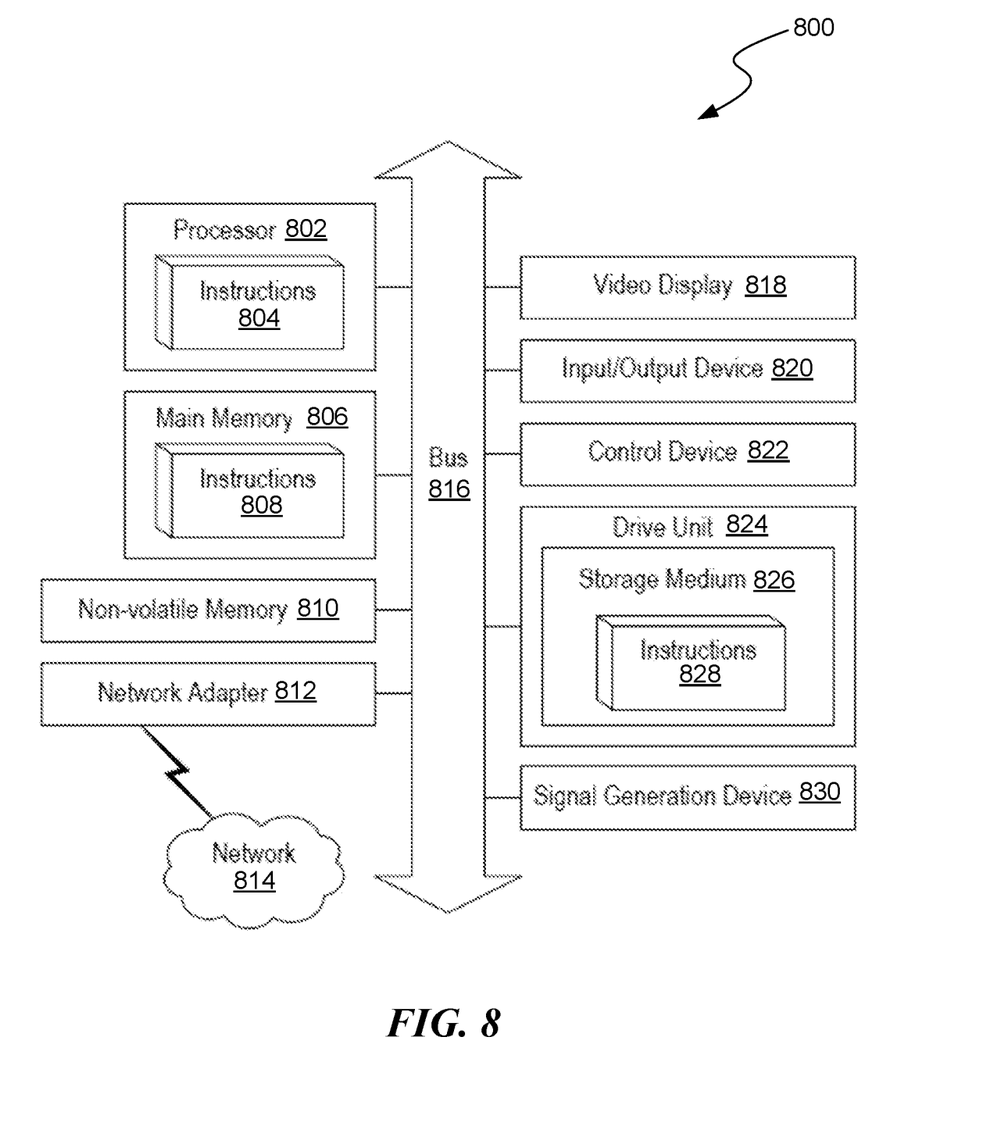
FIG. 8 is a block diagram of an exemplary computing system.

FIG. 8 is a block diagram illustrating an example computer system 800, in accordance with one or more embodiments. In some embodiments, components of the example computer system 800 are used to implement the software platforms described herein. At least some operations described herein can be implemented on the computer system 800.

The computer system 800 can include one or more central processing units ("processors") 802, main memory 806, non-volatile memory 810, network adapters 812 (e.g., network interface), video displays 818, input/output devices 820, control devices 822 (e.g., keyboard and pointing devices), drive units 824 including a storage medium 826, and a signal generation device 830 that are communicatively connected to a bus 816. The bus 816 is illustrated as an abstraction that represents one or more physical buses and/or point-to-point connections that are connected by appropriate bridges, adapters, or controllers. The bus 816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 800 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify actions to be taken by the computer system 800.

While the main memory 806, non-volatile memory 810, and storage medium 826 (also called a "machine-readable medium") are shown to be a single medium, the term "machine-readable medium" and "storage medium" should be taken to include a single medium or multiple media e.g., a centralized/distributed database and/or associated caches and servers, that store one or more sets of instructions 828. The term "machine-readable medium" and "storage medium" shall also be taken to include any medium that can storing, encoding, or carrying a set of instructions for execution by the computer system 800. In some embodiments, the non-volatile memory 810 or the storage medium 826 is a non-transitory, computer-readable storage medium storing computer instructions, which can be executed by the one or more central processing units ("processors") 802 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions, e.g., instructions 804, 808, 828 set at various times in various memory and storage devices in a computer device. When read and executed by the one or more processors 802, the instructions cause the computer system 800 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the type of machine or computer-readable media used to actually effect the distribution.

Further examples of machine-readable storage media, machine-readable media, or computer-readable media include recordable-type media such as volatile and non-volatile memory 810, floppy and other removable disks, hard disk drives, optical discs, e.g., Compact Disc Read-Only Memory (CD-ROMS), Digital Versatile Discs (DVDs)), and transmission-type media such as digital and analog communication links.

The network adapter 812 enables the computer system 800 to mediate data in a network 814 with an entity that is external to the computer system 800 through any communication protocol supported by the computer system 800 and the external entity. The network adapter 812 can include a network adapter card, a wireless network interface card, a router, an access point, a wireless router, a switch, a multi-layer switch, a protocol converter, a gateway, a bridge, a bridge router, a hub, a digital media receiver, and/or a repeater.

The network adapter 812 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications, e.g., to regulate the flow of traffic and resource sharing between these entities. The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example ML system 900 illustrated and described in more detail with reference to FIG. 9.

Machine Learning System

Figure 9:
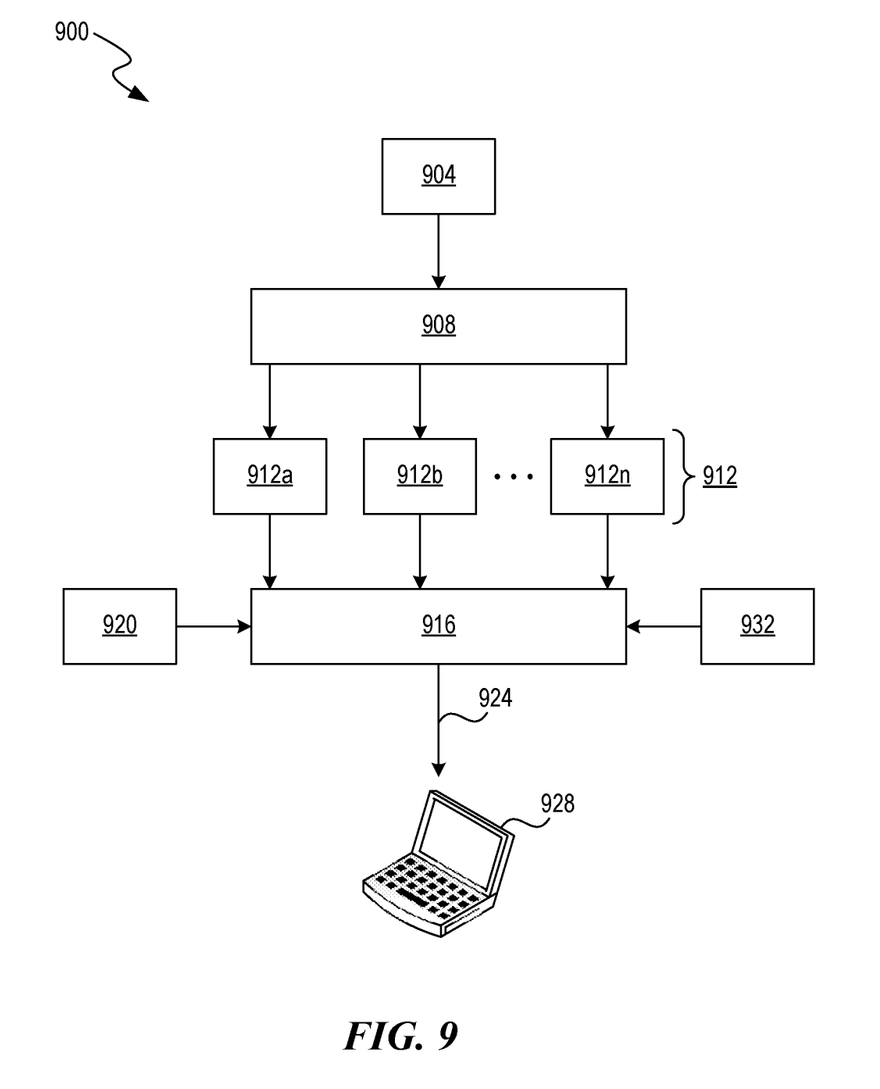
FIG. 9 is a block diagram illustrating an example machine learning (ML) system, in accordance with one or more embodiments.

FIG. 9 is a block diagram illustrating an example ML system 900, in accordance with one or more embodiments. The ML system 900 is implemented using components of the example computer system 800 illustrated and described in more detail with reference to FIG. 9. Likewise, embodiments of the ML system 900 can include different and/or additional components or be connected in different ways. The ML system 900 is sometimes referred to as a ML module.

The ML system 900 includes a feature extraction module 908 implemented using components of the example computer system 800 illustrated and described in more detail with reference to FIG. 8. In some embodiments, the feature extraction module 908 extracts a feature vector 912 from input data 904. For example, the input data 904 can include one or more images, sets of text, audio files, or video files. The feature vector 912 includes features 912a, 912b, 912n. The feature extraction module 908 reduces the redundancy in the input data 904, e.g., repetitive data values, to transform the input data 904 into the reduced set of feature vectors 912, e.g., features 912a, 912b, . . . 912n. The feature vector 912 contains the relevant information from the input data 904, such that events or data value thresholds of interest can be identified by the ML model 916 by using this reduced representation. In some example embodiments, dimensionality reduction techniques, such as principal component analysis (PCA) or autoencoders are used by the feature extraction module 908.

In alternate embodiments, the ML model 916 performs deep learning (also known as deep structured learning or hierarchical learning) directly on the input data 904 to learn data representations, as opposed to using task-specific algorithms. In deep learning, no explicit feature extraction is performed; the feature vectors 912 are implicitly extracted by the ML system 900. For example, the ML model 916 can use a cascade of multiple layers of nonlinear processing units for implicit feature extraction and transformation. Each successive layer uses the output from the previous layer as input. The ML model 916 can learn in supervised (e.g., classification) and/or unsupervised (e.g., pattern analysis) modes. The ML model 916 can learn multiple levels of representations that correspond to different levels of abstraction, wherein the different levels form a hierarchy of concepts. In this manner, the ML model 916 can be configured to differentiate features of interest from background features.

In alternative example embodiments, the ML model 916, e.g., in the form of a CNN generates the output 924, without the need for feature extraction, directly from the input data 904. The output 924 is provided to the computer device 928. The computer device 928 is a server, computer, tablet, smartphone, smart speaker, etc., implemented using components of the example computer system 800 illustrated and described in more detail with reference to FIG. 8. In some embodiments, the steps performed by the ML system 900 are stored in memory on the computer device 928 for execution. In other embodiments, the output 924 is displayed on high-definition monitors.

A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 916 can be a CNN that includes both convolutional layers and max pooling layers. The architecture of the ML model 916 can be fully convolutional, which means that variable sized sensor data vectors can be fed into it. For all convolutional layers, the ML model 916 can specify a kernel size, a stride of the convolution, and an amount of zero padding applied to the input of that layer. For the pooling layers, the ML model 916 can specify the kernel size and stride of the pooling.

In some embodiments, the ML system 900 trains the ML model 916, based on the training data 920, to correlate the feature vector 912 to expected outputs in the training data 920. As part of the training of the ML model 916, the ML system 900 forms a training set of features and training labels by identifying a positive training set of features that have been determined to have a desired property in question and a negative training set of features that lack the property in question. The ML system 900 applies ML techniques to train the ML model 916, that when applied to the feature vector 912, outputs indications of whether the feature vector 912 has an associated desired property or properties.

The ML system 900 can use supervised ML to train the ML model 916, with features from the training sets serving as the inputs. In some embodiments, different ML techniques, such as support vector machine (SVM), regression, naïve Bayes, random forests, neural networks, etc., are used. In some example embodiments, a validation set 932 is formed of additional features, other than those in the training data 920, which have already been determined to have or to lack the property in question. The ML system 900 applies the trained ML model 916 to the features of the validation set 932 to quantify the accuracy of the ML model 916. In some embodiments, the ML system 900 iteratively re-trains the ML model 916 until the occurrence of a stopping condition, such as the accuracy measurement indication that the ML model 916 is sufficiently accurate, or several training rounds having taken place.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Note that any of the embodiments described above can be combined with each other, except to the extent that it may be stated otherwise above or to the extent that any such embodiments might be mutually exclusive in function and/or structure.

Although the invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method comprising:
providing a real-time multimedia stream at multiple encoding rates including a higher-quality encoding and a lower-quality encoding, wherein each portion of the real-time multimedia stream is equally ranked in encoding delivery;
during a broadcast of the real-time multimedia stream, receiving, a plurality of content tags at specified timestamps, wherein the plurality of content tags are indicative of a priority of encoding delivery; and
providing a delayed multimedia stream that includes content corresponding to the real-time multimedia stream, wherein delivery of portions of the delayed multimedia stream that correspond to the plurality of content tags is prioritized via inserting additional camera angles of portions marked by content tags in series, wherein inserting the additional camera angles in series further delays the multimedia stream and affects a length of the delayed multimedia stream.

2. The method of claim 1, further comprising:
generating, by a machine learning model, the plurality of content tags at the specified timestamps based on supervised training associated with a subject matter of the real-time multimedia stream, wherein the specified timestamps correlate to portions of the real-time multimedia stream of high interest to a viewing audience as determined by the supervised training.

3. The method of claim 2, wherein the supervised training is performed by model observations of an administrative user generating content tags in past real-time multimedia streams.

4. The method of claim 1, further comprising:
generating, by a viewing audience of the real-time multimedia stream, the plurality of content tags at the specified timestamps based on aggregate use of social features associated with a user interface of the real-time multimedia stream.

5. The method of claim 1, wherein the plurality of content tags are generated by an administrative user.

6. The method of claim 1, further comprising:
generating, by a viewing audience of the real-time multimedia stream, wherein the plurality of content tags at the specified timestamps are based on aggregate measured behavior of the viewing audience including any combination of:
window precedence;
eye gaze tracking; or
operation of volume or muting controls.

7. The method of claim 1, further comprising:
during the broadcast of the real-time multimedia stream, receiving, a plurality of downvote tags at a second set of specified timestamps, wherein the plurality of downvote tags are indicative of a decreased priority of encoding delivery, wherein delivery of portions of the delayed multimedia stream that correspond to the plurality of downvote tags is deemphasized via any of:
downshifting encoding rates of downvoted content based on latency; or
integrating textual information overlays into the delayed multimedia stream.

8. The method of claim 1, wherein the plurality of content tags are upvote tags and the priority of encoding delivery is an increased priority.

9. The method of claim 1, wherein the real-time multimedia stream includes multiple camera angle inputs that are interchanged into a presenting camera of the real-time multimedia stream during the broadcast, the method further comprising:
modifying the content of the delayed multimedia stream based on the specified timestamps of the plurality of content tags via any of:

inserting additional camera angles of portions marked by the plurality of content tags either in series or in frame share; or
interchanging the presenting camera from a first camera of the multiple camera angle inputs to a second camera of the multiple camera angle inputs.

10. The method of claim 1, wherein the delayed multimedia stream is any of:
video on demand; or
delayed a specified number of seconds after the real-time multimedia stream.

11. The system of claim 1, wherein delivery of portions of the delayed multimedia stream that correspond to the plurality of content tags is prioritized via prebuffering or downshifting encoding rates of surrounding content.

12. A method comprising:
providing a first multimedia stream at multiple encoding rates including a higher-quality encoding and a lower-quality encoding, wherein the first multimedia stream includes multiple camera angle inputs that are interchanged into a presenting camera of the first multimedia stream during a broadcast, wherein each portion of the first multimedia stream is equally ranked in encoding delivery;
during the broadcast of the first multimedia stream, receiving, a plurality of content tags at specified timestamps, the plurality of content tags are indicative of a priority of encoding delivery; and
providing a delayed multimedia stream that includes content corresponding to the first multimedia stream, wherein delivery of portions of the delayed multimedia stream that correspond to the plurality of content tags is prioritized via inserting additional camera angles of portions marked by content tags in series, wherein inserting the additional camera angles in series further delays the multimedia stream and affects a length of the delayed multimedia stream.

13. The method of claim 12, further comprising:
generating, by a machine learning model, the plurality of content tags at the specified timestamps based on supervised training associated with a subject matter of the first multimedia stream, wherein the specified timestamps correlate to portions of the first multimedia stream of high interest to a viewing audience as indicated by the supervised training.

14. The method of claim 13, wherein the supervised training is performed by model observations of an administrative user generating content tags in past multimedia streams.

15. The method of claim 12, further comprising:
generating, by a viewing audience of the first multimedia stream, the plurality of content tags at the specified timestamps based on aggregate use of social features associated with a user interface of the first multimedia stream.

16. The method of claim 12, wherein the plurality of content tags are generated by an administrative user.

17. The method of claim 12, further comprising:
generating, by a viewing audience of the first multimedia stream, the plurality of content tags at the specified timestamps based on aggregate measured behavior of the viewing audience including any combination of:
window precedence;
eye gaze tracking; or
operation of volume or muting controls.

18. The method of claim 12, wherein the plurality of content tags are upvote tags and the priority of encoding delivery is an increased priority.

19. The method of claim 12, wherein delivery of portions of the delayed multimedia stream that correspond to the plurality of content tags is prioritized via interchanging the presenting camera from a first camera of the multiple camera angle inputs to a second camera of the multiple camera angle inputs, prebuffering or downshifting encoding rates of surrounding content.

20. A method comprising:
providing a real-time multimedia stream at multiple encoding rates including a higher-quality encoding and a lower-quality encoding, wherein each portion of the real-time multimedia stream is equally ranked in encoding delivery;
during a broadcast of the real-time multimedia stream, receiving, a plurality of downvote tags at specified timestamps, wherein the plurality of downvote tags are indicative of a decreased priority of encoding delivery; and
providing a delayed multimedia stream that includes content corresponding to the real-time multimedia stream, wherein delivery of portions of the delayed multimedia stream that correspond to the plurality of downvote tags is deemphasized via removing camera angles of portions marked by downvote tags and inserting additional camera angles marked by positive content tags, wherein inserting additional camera angles in series further delays the delayed multimedia stream.

21. The method of claim 20, further comprising:
generating, by a machine learning model, the plurality of downvote tags at the specified timestamps based on supervised training associated with a subject matter of the real-time multimedia stream, wherein the specified timestamps correlate to portions of the real-time multimedia stream of high interest to a viewing audience as determined by the supervised training.

22. The method of claim 20, further comprising:
generating, by a viewing audience of the real-time multimedia stream, the plurality of downvote tags at the specified timestamps based on aggregate use of social features associated with a user interface of the real-time multimedia stream.

23. The method of claim 20, wherein the plurality of downvote tags are generated by an administrative user.

24. The method of claim 20, further comprising:
generating, by a viewing audience of the real-time multimedia stream, wherein the plurality of downvote tags at the specified timestamps are based on aggregate measured behavior of the viewing audience including any combination of:
window precedence;
eye gaze tracking; or
operation of volume or muting controls.

25. The method of claim 20, wherein delivery of portions of the delayed multimedia stream that correspond to the plurality of downvote tags is deemphasized via downshifting encoding rates of downvoted content based on latency.

26. A system comprising:
a broadcast server that is configured to transmit a real-time multimedia stream at multiple encoding rates including a higher-quality encoding and a lower-quality encoding, wherein each portion of the real-time multimedia stream is equally ranked in encoding delivery;
a streaming platform configured to receive a plurality of content tags at specified timestamps during broadcast of the real-time multimedia stream, wherein, the plurality of content tags are indicative of a priority of encoding delivery; and a memory storing a delayed multimedia stream that includes content corresponding to the real-time multimedia stream, wherein delivery of portions of the delayed multimedia stream that correspond to the plurality of content tags is prioritized via inserting additional camera angles of portions marked by content tags in series, wherein inserting the additional camera angles affects a length of the delayed stream.

27. The system of claim 26, further comprising:

a machine learning model stored in the memory configured to generate the plurality of content tags at the specified timestamps based on supervised training associated with a subject matter of the real-time multimedia stream, wherein the specified timestamps correlate to portions of the real-time multimedia stream of high interest to a viewing audience as indicated by the supervised training.

28. The system of claim 27, wherein the supervised training is performed by model observations of an administrative user generating content tags in past real-time multimedia streams.

29. The system of claim 26, further comprising:

a user viewing interface configured to generate, by a viewing audience of the real-time multimedia stream, the plurality of content tags at the specified timestamps based on aggregate use of social features of the user viewing interface.

30. The system of claim 26, wherein the plurality of content tags are generated by an administrative user.

31. The system of claim 26, further comprising:

a user viewing interface configured to generate, by a viewing audience of the real-time multimedia stream, the plurality of content tags the specified timestamps based on aggregate measured behavior of the viewing audience including any combination of:
window precedence;
eye gaze tracking; or
operation of volume or muting controls.

32. The system of claim 26, wherein the plurality of content tags are upvote tags and the priority of encoding delivery is an increased priority.

33. The system of claim 26, wherein delivery of portions of the delayed multimedia stream that correspond to the plurality of content tags is prioritized via prebuffering or downshifting encoding rates of surrounding content.

* * * * *